United States Patent Office 3,102,036
Patented Aug. 27, 1963

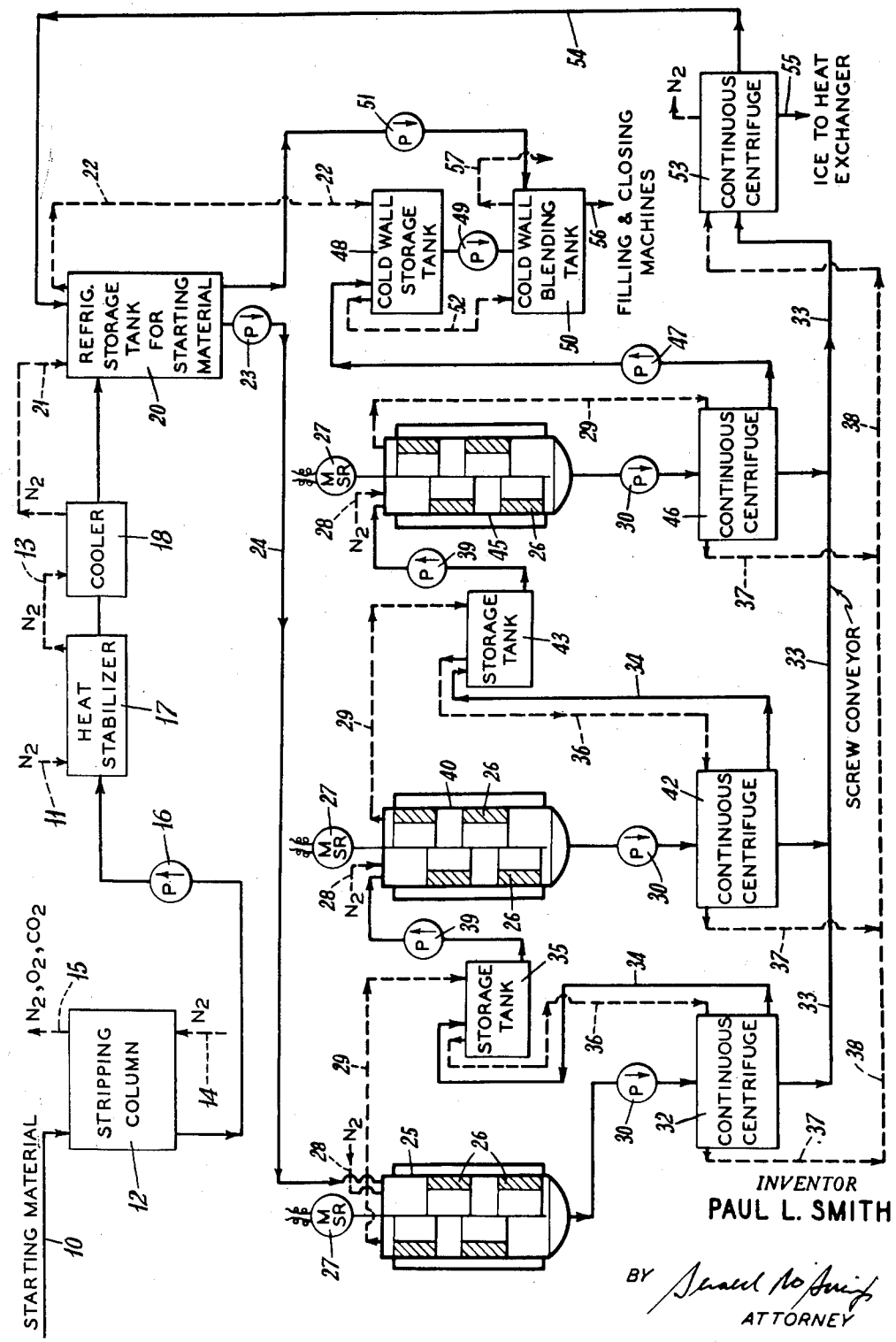

3,102,036
FREEZE CONCENTRATION PROCESS
Paul L. Smith, Orlando, Fla., assignor to Union Carbide Corporation, a corporation of New York
Filed July 20, 1960, Ser. No. 44,091
4 Claims. (Cl. 99—205)

The present invention relates to processes of freeze concentration and, more particularly, to processes of freeze concentration wherein oxygen is removed from the solution being concentrated.

This application is a continuation-in-part of my copending United States patent application, Serial No. 725,117, filed March 31, 1958, entitled "Concentrated Fruit Juice and Method," now abandoned.

Heretofore, it has been proposed to preserve the flavorous constituents and other desirable qualities in concentrated solutions by freeze concentration processes wherein the solvent of the solution to be concentrated is frozen and then separated from the resulting concentrated solution. More recently, such freeze concentration processes have been developed which operate on a continuous basis rather than a batch basis. However, when a freeze concentration process is employed, oxygen is not removed from the solution, and the color, flavor, and nutritive value of many solutions deteriorate on exposure to oxygen. The rate of deterioration is especially rapid during stages of processing wherein high temperatures are employed.

It is, therefore, the main object of the present invention to provide a freeze concentration process wherein oxygen is removed from the solution being concentrated.

It is another object of the invention to provide a continuous freeze concentration process wherein oxidation of the solution being concentrated is prevented.

Other aims and advantage of the present invention will be apparent from the following description and appended claims.

In accordance with the present invention, there is provided a process for the concentration of a solution of heat-sensitive material comprising: subjecting the solution to a stripping operation wherein a substantially inert gas is passed through the solution so as to preferentially displace substantially all the oxygen present in the solution; decreasing the temperature of the solution to at least the freezing point of the solvent of the solution; and removing frozen solvent from the resulting concentrated solution, while continuously maintaining the solution in a nonoxidizing atmosphere after the stripping operation. As employed herein, the term "heat-sensitive material" refers to any material susceptible to an adverse change in its properties or composition brought about solely by the effect of heat, the degree of change varying with both temperature and time. Typical examples of solutions of such heat-sensitive materials are fruit juices, beer, wines, coffee, milk, vegetable juices, heat-sensitive resins, pharmaceuticals such as antibiotics, and the like.

In the drawing the single FIGURE is a flow sheet of a preferred continuous freeze concentration process embodying the present invention.

Referring specifically to the drawing, a single strength solution of heat-sensitive material is supplied through a line 10 to a stripping column 12. A nonoxidizing gas, preferably nitrogen, is fed into the bottom of the stripping column 12 through a line 14 and removes oxygen and carbon dioxide from the solution. Alternatively, other inert gases, such as argon, helium, and hydrogen, could be employed for the stripping operation. The nitrogen gas and entrained oxygen and carbon dioxide are discharged through an exhaust line 15.

The oxygen-free, single strength solution from the stripping column 12 is fed into the heat stabilizer 17 by a pump 16. From the heat stabilizer 17, the stabilized solution passes through a line 13 into the cooler 18, and on through a line 21 into the tank 20.

From the storage tank 20, single strength solution passes through a pump 23 and line 24 into a cold-walled tank 25, wherein the temperature of the solution is reduced to at least the freezing point of the solution. The inner surface of this tank is engaged by scrapers 26 on an axial shaft driven by a motor and speed-reducer unit 27. The head space of the tank 25 is blanketed by an inert gas, such as nitrogen, introduced through a line 28 and taken off through a line 29.

From the bottom of the tank 25, a slurry of frozen solvent and concentrated solution is taken off by a pump 30 and passes into a continuous centrifuge 32 which separates the frozen solvent from the concentrated solution. The concentrated solution from the centrifuge 32 passes through a line 34 to a storage tank 35. The separated solvent crystals with some retained liquor from the bottom of the centrifuge 32 pass to a screw conveyor 33. The head space of storage tank 35 is blanketed by the inert gas from line 29, which passes therefrom through a line 36 to the centrifuge 32, from which it passes through a line 37 to a manifold conduit 38.

The concentrated solution from the storage tank 35 is fed by a pump 39 to a second-stage, cold-walled tank 40, wherein it is again subjected to a temperature at least as low as the freezing point of the solvent of the solution. Tank 40 is provided with similar scrapers 26 driven by a motor and speed-reducer unit 27. The head space of the second-stage tank 40 is blanketed by inert gas supplied through a similar line 28 and taken off through a line 29.

From the bottom of the tank 40, a slurry of frozen solvent and concentrated solution is taken off by a pump 30 and passed into a second-stage centrifuge 42 which separates frozen solvent from the concentrated solution. The separated solution from the centrifuge 42 passes through a line 34 to a second-stage storage tank 43. The separated solvent crystals are discharged into the screw conveyor 33. The head space of storage tank 43 is blanketed by the inert gas from line 29, which passes therefrom through a line 36 to the centrifuge 42, and on through a line 37 to the manifold conduit 38.

The concentrated solution from the second-stage storage tank 43 is fed by a pump 39 to a third-stage, cold-walled tank 45, wherein it is again subjected to a temperature at least as low as the freezing point of the solvent of the solution. Tank 45 is provided with scrapers 26 driven by a motor and speed-reducer unit 27. The head space of the third-stage tank 45 is blanketed by inert gas supplied through a similar line 28 and taken off through a line 29.

From the bottom of the tank 45, a slurry of frozen solvent and concentrated solution is taken off by a pump 30 and passed into a third-stage centrifuge 46 which separates the frozen solvent from the concentrated solution. The separated solution from the centrifuge 46 is fed by a pump 47 to a cold-walled storage tank 48. The separated solvent crystals are discharged into the screw conveyor 33. The head space of centrifuge 46 is blanketed by the inert gas from line 29, which passes therefrom through a line 37 to the manifold conduit 38. The head space of the storage tank 48 is blanketed by inert gas from line 22 leading from the storage tank 20.

From tank 48, the concentrated solution is fed by a pump 49 to a cold-walled blending tank 50, to which single strength solution from tank 20 is fed by a pump 51 to control the concentration of the final product. The blending tank 50 is blanketed by inert gas taken from tank 48 through line 52. From tank 50, the blended product passes into filling and closing machines as at 56, and the blanketing gas is exhausted through a line 57.

From the screw conveyor 33, the ice crystals with some retained solution pass into a final continuous centrifuge 53. The recovered solution from centrifuge 53 passes through a line 54 to the starting tank 20. The frozen solvent is exhausted through a line 55.

Although the present invention has been described above in connection with one preferred freeze concentration process, the invention in its broadest scope will apply equally to all freeze concentration processes, i.e., processes wherein a solution of heat-sensitive material is concentrated by reducing the temperature of the solution to at least the freezing point of the solvent of the solution and removing frozen solvent from the solution. The freezing and separating operations can be accomplished by means other than those described above, and supplementary steps can be utilized in the process as additional processing steps. Also, the stripping operation which removes the oxygen from the solution can be employed at intermediate points in the process rather than as the initial step. However, since it is desirable to remove the oxygen from the solution as soon as possible, it is preferable to employ the oxygen stripping step early in the process.

One point of novelty in the process of the present invention resides in preventing the oxidation of a solution to be concentrated by a freeze concentration process by removing oxygen from the solution by the hereinbefore-described stripping operation and then continuously maintaining the oxygen-free solution in a nonoxidizing atmosphere. To provide adequate protection for extended storage periods, it is preferable to reduce the oxygen content of the solution to a concentration between 0.1 to 0.4 part per million.

In an example of the inventive process, orange juice was passed through a stripping column prior to being concentrated by a freeze concentration process. The feed juice was at a temperature of about 38°–45° F. and was processed at a flow rate of 3000–4000 gal./hr. Nitrogen gas was passed through the juice in the column at a rate of 200–300 cu. ft./hr. Juice leaving the stripping column was continuously maintained in an atmosphere of nitrogen. The concentration of oxygen in the juice was checked at various points and found to be: 4–8 parts per million before stripping; 0–3 parts per million after stripping but before freeze concentration; and 0–3 parts per million after freeze concentration in an atmosphere of nitrogen.

Samples of the nitrogen processes concentrate and samples of air-processed concentrate were stored for varying periods of time and then subjected to taste tests of a subjective nature. The results of the tests were consistently in favor of the nitrogen-processed juice, and the degree of preference increased as the storage times of the samples increased.

In another example of the inventive process, cow's milk was subjected to a stripping operation by nitrogen gas prior to being concentrated by a freeze concentration process. The milk was processed at a rate of about three gal./min. and nitrogen gas was passed through the milk in the stripping column at a rate of about 25 cu. ft./hr. Milk leaving the stripping column was continuously maintained in an atmosphere of nitrogen throughout the remainder of the process. The concentration of oxygen in the milk was found to be: 12 parts per million before stripping; 0.25 part per million after stripping but before freeze concentration; and 0.72–0.83 part per million after freeze concentration in an atmosphere of nitrogen. The increase in oxygen during concentration was caused by a leak in the system.

Samples of the nitrogen-processed milk concentrate and samples of air-processed milk concentrate were stored for varying periods of time and then subjected to taste tests of a subjective nature. The results of the tests were consistently in favor of the nitrogen-processed milk, and the degree of preference increased as the storage time of the samples increased.

What is claimed is:

1. A process for the concentration of a solution of heat-sensitive material in a solvent comprising: subjecting said solution to a stripping operation wherein a substantially inert gas is passed through said solution so as to preferentially displace substantially all the oxygen present in said solution; decreasing the temperature of said solution to at least the freezing point of the solvent of said solution; and removing frozen solvent from the resulting concentrated solution, while continuously maintaining said solution in a nonoxidizing atmosphere after said stripping operation.

2. A process for the concentration of a solution of heat-sensitive material in a solvent comprising: subjecting said solution to a stripping operation wherein a substantially inert gas is passed through said solution so as to reduce the oxygen present in said solution to a concentration between 0.1 to 0.4 part per million; decreasing the temperature of said solution to at least the freezing point of the solvent of said solution; and removing frozen solvent from the resulting concentrated solution, while continuously maintaining said solution in a nonoxidizing atmosphere after said stripping operation.

3. A process for the concentration of fruit juice comprising: subjecting said juice to a stripping operation wherein a substantially inert gas is passed through said juice so as to preferentially displace substantially all the oxygen present in said juice; decreasing the temperature of said juice to at least 32° F.; and removing ice from the resulting concentrated juice, while continuously maintaining said juice in a nonoxidizing atmosphere after said stripping operation.

4. In a process for the concentration of a solution of heat-sensitive material wherein the temperature of said solution is decreased to at least the freezing point of the solvent of said solution and frozen solvent is removed from the resulting concentrated solution, the improvement which comprises subjecting said solution to a stripping operation wherein a nonoxidizing gas preferentially displaces at least a portion of oxygen present in said solution and continuously maintaining said solution which has been subjected to said stripping operation in a nonoxidizing atmosphere.

References Cited in the file of this patent

UNITED STATES PATENTS

| | | |
|---|---|---|
| 2,400,748 | Flosdorf | May 21, 1946 |
| 2,750,998 | Moore | June 19, 1956 |
| 2,862,824 | Wenzelberger | Dec. 2, 1958 |
| 2,903,371 | Toulmin | Sept. 8, 1959 |